United States Patent
Kamata

(10) Patent No.: US 9,923,417 B2
(45) Date of Patent: *Mar. 20, 2018

(54) WIRELESS POWER FEEDING SYSTEM

(71) Applicant: SEMICONDUCTOR ENERGY LABORATORY CO., LTD., Atsugi-shi, Kanagawa-ken (JP)

(72) Inventor: Koichiro Kamata, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 92 days.

This patent is subject to a terminal disclaimer.

(21) Appl. No.: 14/795,109

(22) Filed: Jul. 9, 2015

(65) Prior Publication Data

US 2015/0311744 A1    Oct. 29, 2015

Related U.S. Application Data

(63) Continuation of application No. 13/490,497, filed on Jun. 7, 2012, now Pat. No. 9,099,885.

(30) Foreign Application Priority Data

Jun. 17, 2011    (JP) .................................. 2011-135059

(51) Int. Cl.
*H02J 7/00*    (2006.01)
*H02J 50/12*   (2016.01)
(Continued)

(52) U.S. Cl.
CPC ............. *H02J 50/12* (2016.02); *H02J 5/005* (2013.01); *H02J 7/025* (2013.01); *H02J 7/045* (2013.01); *H02J 50/90* (2016.02)

(58) Field of Classification Search
CPC ............. H02J 5/005; H02J 7/025; H02J 7/045
See application file for complete search history.

(56) References Cited

U.S. PATENT DOCUMENTS 5,710,502 A * 1/1998 Poumey ................ B60L 11/182
                                                                320/108
5,731,856 A    3/1998 Kim et al.
(Continued)

FOREIGN PATENT DOCUMENTS

EP    1737044 A    12/2006
EP    2079146 A    7/2009
(Continued)

OTHER PUBLICATIONS

Kurs.A et al., "Wireless Power Transfer via Strongly Coupled Magnetic Resonances", Science, Jul. 6, 2007, vol. 317, No. 5834, pp. 83-86.
(Continued)

*Primary Examiner* — Vuthe Siek
(74) *Attorney, Agent, or Firm* — Nixon Peabody LLP; Jeffrey L. Costellia

(57) ABSTRACT

An object is to provide a wireless power feeding system using the resonance method, which can increase power transmission efficiency. The wireless power feeding system includes a power transmission coil electrically connected to a high-frequency power supply, a power transmission resonance coil for transmitting power by electromagnetic induction with the power transmission coil, a power reception resonance coil for exciting high-frequency power by magnetic resonance, a load coil for exciting high-frequency power by electromagnetic induction with the power reception resonance coil, a load, and a variable element. The load includes a microprocessor for controlling the impedance of the load, a battery charger, and a battery. The battery charger is configured to charge the battery with the high-frequency power excited by the load coil.

19 Claims, 8 Drawing Sheets

(51) Int. Cl.
*H02J 50/90* (2016.01)
*H02J 7/02* (2016.01)
*H02J 7/04* (2006.01)
*H02J 5/00* (2016.01)

(56) References Cited

U.S. PATENT DOCUMENTS

| | | |
|---|---|---|
| 5,744,864 A | 4/1998 | Cillessen et al. |
| 6,294,274 B1 | 9/2001 | Kawazoe et al. |
| 6,563,174 B2 | 5/2003 | Kawasaki et al. |
| 6,636,146 B1 | 10/2003 | Wehoski |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,710,751 B2 * | 5/2010 | Nishino .......... B60L 5/005 363/125 |
| 7,732,819 B2 | 6/2010 | Akimoto et al. |
| 8,090,550 B2 | 1/2012 | Azancot et al. |
| 8,188,709 B2 | 5/2012 | Onishi et al. |
| 8,310,108 B2 * | 11/2012 | Inoue .......... B60L 11/123 307/104 |
| 8,362,744 B2 | 1/2013 | Terao et al. |
| 8,441,364 B2 | 5/2013 | Azancot et al. |
| 8,624,548 B2 | 1/2014 | Yamazaki et al. |
| 8,626,461 B2 | 1/2014 | Azancot et al. |
| 8,629,577 B2 | 1/2014 | Azancot et al. |
| 8,716,974 B2 | 5/2014 | Sakoda et al. |
| 8,749,097 B2 | 6/2014 | Azancot et al. |
| 8,811,901 B2 | 8/2014 | Shionoiri et al. |
| 8,836,170 B2 | 9/2014 | Shionoiri et al. |
| 8,901,777 B2 | 12/2014 | Kamata et al. |
| 8,948,696 B2 | 2/2015 | Yamashita et al. |
| 8,965,720 B2 | 2/2015 | Azancot et al. |
| 8,970,060 B2 | 3/2015 | Ichikawa et al. |
| 9,099,885 B2 * | 8/2015 | Kamata .......... H02J 7/025 |
| 9,114,718 B2 | 8/2015 | Yamazaki et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0096413 A1 | 4/2009 | Partovi et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0244577 A1 | 9/2010 | Shimokawa |
| 2010/0258802 A1 * | 10/2010 | Godo .......... H01L 29/7869 257/57 |
| 2010/0259109 A1 | 10/2010 | Sato |
| 2011/0169337 A1 | 7/2011 | Kozakai |
| 2011/0227074 A1 * | 9/2011 | Kato .......... H01L 27/0688 257/57 |
| 2011/0241440 A1 | 10/2011 | Sakoda et al. |
| 2011/0270462 A1 | 11/2011 | Amano et al. |
| 2011/0304217 A1 | 12/2011 | Yamamoto et al. |
| 2012/0009869 A1 | 1/2012 | Suzuki et al. |
| 2012/0032521 A1 | 2/2012 | Inoue et al. |
| 2012/0038619 A1 | 2/2012 | Shraga et al. |
| 2012/0062039 A1 | 3/2012 | Kamata et al. |
| 2012/0161529 A1 | 6/2012 | Kamata et al. |
| 2012/0161537 A1 | 6/2012 | Kamata |
| 2012/0193994 A1 | 8/2012 | Kamata |
| 2012/0223593 A1 | 9/2012 | Kamata |
| 2012/0228956 A1 | 9/2012 | Kamata |
| 2012/0228957 A1 | 9/2012 | Miyauchi |
| 2014/0008997 A1 | 1/2014 | Azancot et al. |
| 2014/0312688 A1 | 10/2014 | Azancot et al. |
| 2015/0008758 A1 | 1/2015 | Shionoiri et al. |
| 2015/0214752 A1 | 7/2015 | Gluzman et al. |

FOREIGN PATENT DOCUMENTS

| | | |
|---|---|---|
| EP | 2154763 A | 2/2010 |
| EP | 2161808 A | 3/2010 |

(56) References Cited

FOREIGN PATENT DOCUMENTS

| | | | |
|---|---|---|---|
| EP | 2226847 A | 9/2010 | |
| EP | 2320538 A | 5/2011 | |
| EP | 2346141 A | 7/2011 | |
| JP | 60-198861 A | 10/1985 | |
| JP | 63-210022 A | 8/1988 | |
| JP | 63-210023 A | 8/1988 | |
| JP | 63-210024 A | 8/1988 | |
| JP | 63-215519 A | 9/1988 | |
| JP | 63-239117 A | 10/1988 | |
| JP | 63-265818 A | 11/1988 | |
| JP | 05-251705 A | 9/1993 | |
| JP | 08-264794 A | 10/1996 | |
| JP | 11-505377 | 5/1999 | |
| JP | 2000-044236 A | 2/2000 | |
| JP | 2000-150900 A | 5/2000 | |
| JP | 2001-502833 | 2/2001 | |
| JP | 2002-076356 A | 3/2002 | |
| JP | 2002-101578 A | 4/2002 | |
| JP | 2002-289859 A | 10/2002 | |
| JP | 2003-086000 A | 3/2003 | |
| JP | 2003-086808 A | 3/2003 | |
| JP | 2004-103957 A | 4/2004 | |
| JP | 2004-273614 A | 9/2004 | |
| JP | 2004-273732 A | 9/2004 | |
| JP | 2009-189231 A | 8/2009 | |
| JP | 2010-109972 A | 5/2010 | |
| JP | 2010-119246 A | 5/2010 | |
| JP | 2010-522534 | 7/2010 | |
| JP | 2010-193598 A | 9/2010 | |
| JP | 2010-239690 A | 10/2010 | |
| JP | 2010-252468 A | 11/2010 | |
| JP | 2011-120382 A | 6/2011 | |
| JP | 2011-120443 A | 6/2011 | |
| JP | 2011-182633 A | 9/2011 | |
| WO | WO-2004/114391 | 12/2004 | |
| WO | WO-2008/093334 | 8/2008 | |
| WO | WO-2008/114268 | 9/2008 | |
| WO | WO-2010/035321 | 4/2010 | |
| WO | WO-2010/038596 | 4/2010 | |
| WO | WO-2010/103525 | 9/2010 | |
| WO | WO-2015/155774 | 10/2015 | |

OTHER PUBLICATIONS

Miyamoto.T et al., "Wireless Power Transfer System with a Simple Receiver Coil", IMWS 2011 (2011 IEEE MTT-S International Microwave Workshop Series), May 12, 2011, pp. 131-134.

Asakuma.N. et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Backplane", SID Digest '09 : SID International Symposium Digest of Technical Papers, May 31, 2009, pp. 280-283.

Clark.S et al "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:the "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Godo.H et al., "Temperature Dependence of Characteristics and Electronic Structure For Amorphous In—Ga—Zn-Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDS", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using Cg-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MoO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel, YbFe2O4, and Yb2Fe3O7 Types of Structures for Compounds in the In2O3 and Sc2O3—A2O3—BO

(56) References Cited

OTHER PUBLICATIONS

Systems [A; Fe, Ga, or Al; B: Mg, Mn, Fe, Ni, Cu,or Zn] at Temperatures over 1000° C." Journal of Solid State Chemistry, 1985, vol. 60, pp. 382-384.
Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.
Kitzerow.H et al "Observation of Blue Phases in Chiral Networks", Liquid Crystals, 1993, vol. 14, No. 3, pp. 911-916.
Kurokawa.Y et al., "UHF RFCPUS on Flexible and Glass Substrates for Secure RFID Systems", Journal of Solid-State Circuits, 2008, vol. 43, No. 1, pp. 292-299.
Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.
Lee.H et al., "Current Status of, Challenges to, and Perspective View of AM-OLED ", IDW '06 : Proceedings of the 13th International Display Workshops, Dec. 7, 2006, pp. 663-666.
Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.
Li.C et al., "Modulated Structures of Homologous Compounds InMO3(ZnO)m (M=In,Ga: m=Integer) Described by Four-Dimensional Superspace Group", Journal of Solid State Chemistry, 1998, vol. 139, pp. 347-355.
Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.
Meiboom.S et al., "Theory of the Blue Phase of Cholesteric Liquid Crystals", Phys. Rev.Lett. (Physical Review Letters), May 4, 1981, vol. 46, No. 18, pp. 1216-1219.
Miyasaka.M, "SUFTLA Flexible Microelectronics on Their Way to Business", SID Digest '07 : SID International Symposium Digest of Technical Papers, 2007, vol. 38, pp. 1673-1676.
Mo.Y et al., "Amorphous Oxide TFT Backplanes for Large Size AMOLED Displays", IDW '08 : Proceedings of the 6th International Display Workshops, Dec. 3, 2008, pp. 581-584.
Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.
Nakamura.M, "Synthesis of Homologous Compound with New Long-Period Structure", NIRIM Newsletter, Mar. 1, 1995, vol. 150, pp. 1-4.
Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.
Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.
Nomura.K et al., "Room-Temperature Fabrication of Transparent Flexible Thin-Film Transistors Using Amorphous Oxide Semiconductors", Nature, Nov. 25, 2004, vol. 432, pp. 488-492.
Nomura.K et al., "Thin-Film Transistor Fabricated in Single-Crystalline Transparent Oxide Semiconductor", Science, May 23, 2003, vol. 300, No. 5623, pp. 1269-1272.
Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Oba.F et al. "Defect energetics in ZnO: A hybrid Hartree-Fock density functional study", Phys. Rev. B (Physical Review. B), 2008, vol. 77, pp. 245202-1-245202-6.
Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.
Ohara.H et al., "21.3:4.0 in. QVGA AMOLED Display Using In—Ga—Zn-Oxide TFTs With a Novel Passivation Layer", SID Digest '09 : SID International Symposium Digest of Technical Papers, May 31, 2009, pp. 284-287.
Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.
Orita.M et al., "Amorphous transparent conductive oxide InGaO3(ZnO)m (m <4):a Zn4s conductor", Philosophical Magazine, 2001, vol. 81, No. 5, pp. 501-515.
Orita.M et al., "Mechanism of Electrical Conductivity of Transparent InGaZnO4", Phys. Rev. B (Physical Review. B), Jan. 15, 2000, vol. 61, No. 3, pp. 1811-1816.
Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.
Osada.T et al., "Development of Driver-Integrated Panel Using Amorphous In—Ga—Zn-Oxide TFT", AM-FPD '09 Digest of Technical Papers, Jul. 1, 2009, pp. 33-36.
Park.J et al., "Amorphous Indium-Gallium-Zinc Oxide TFTs and Their Application for Large Size AMOLED", AM-FPD '08 Digest of Technical Papers, Jul. 2, 2008, pp. 275-278.
Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.
Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.
Park.J et al., "High performance amorphous oxide thin film transistors with self-aligned top-gate structure", IEDM 09: Technical Digest of International Electron Devices Meeting, Dec. 7, 2009, pp. 191-194.
Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.
Park.S et al., "Challenge to Future Displays: Transparent AM-OLED Driven by PEALD Grown ZnO TFT", IMID '07 Digest, 2007, pp. 1249-1252.
Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.
Prins.M et al., "A Ferroelectric Transparent Thin-Film Transistor", Appl. Phys. Lett. (Applied Physics Letters) , Jun. 17, 1996, vol. 68, No. 25, pp. 3650-3652.
Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.
Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.
Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.
Tsuda.K et al., "Ultra Low Power Consumption Technologies for Mobile TFT-LCDs ", IDW '02 : Proceedings of the 9th International Display Workshops, Dec. 4, 2002, pp. 295-298.

(56) References Cited

OTHER PUBLICATIONS

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

* cited by examiner

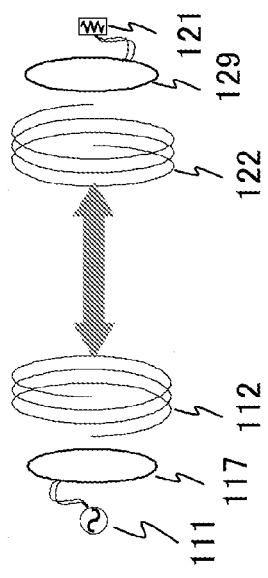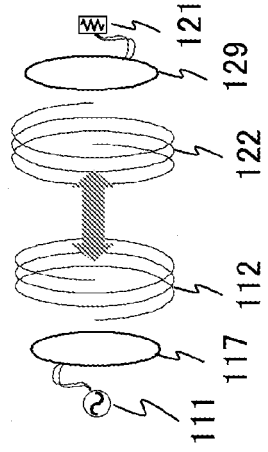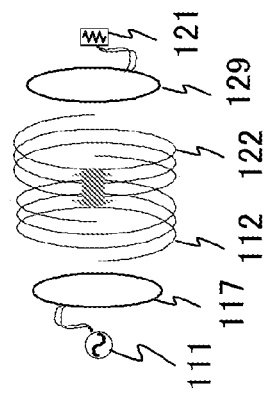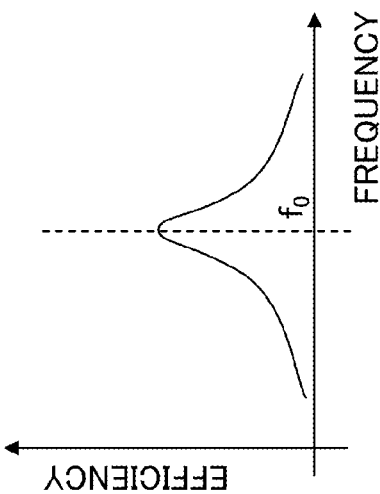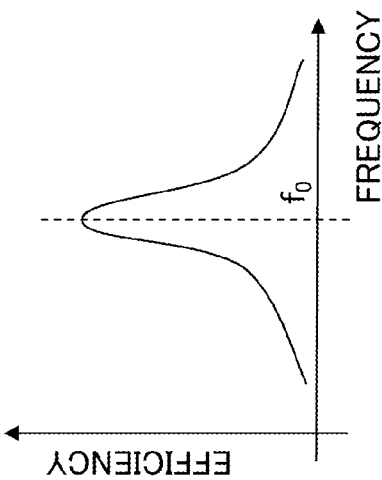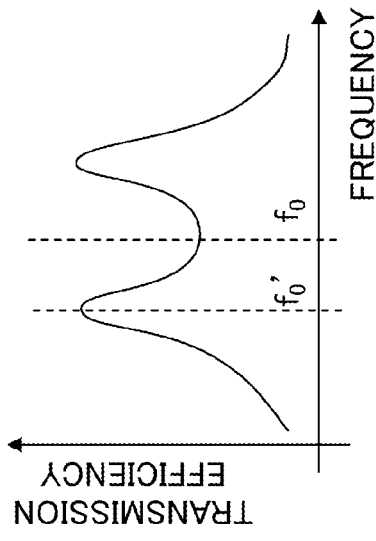

WIRELESS POWER FEEDING SYSTEM

BACKGROUND OF THE INVENTION

1. Field of the Invention

The present invention relates to a wireless power feeding system including a power-receiving device.

2. Description of the Related Art

A method called a magnetic resonance method attracts attention as a method for feeding power to an object (hereinafter also called a power-receiving device) not in contact with a power supply (hereinafter also called a power-transmitting device) (such a method is also called a contactless power feeding method, a wireless power feeding method, or the like). The magnetic resonance method is a method in which resonance coils provided in a power-transmitting device and a power-receiving device are put in magnetic resonance with each other to form an energy propagation path. The magnetic resonance method yields a longer power transmittable distance than other methods (e.g., an electromagnetic induction method and a field induction method). For example, Non-Patent Document 1 discloses that in the magnetic resonance method, transmission efficiency is about 90% when the distance between the resonance coils is 1 m, and is about 45% when the distance between the resonance coils is 2 m.

REFERENCE

Non-Patent Document

[Non-Patent Document 1] Andre Kurs et al., "Wireless Power Transfer via Strongly Coupled Magnetic Resonances", *Science,* 2007, Vol. 317, pp. 83-86.

SUMMARY OF THE INVENTION

In the above-described magnetic resonance method, power feeding is accomplished by magnetic resonance which is produced when a pair of resonance coils having the same resonance frequency is in resonance with each other. Further, the conditions for high efficiency of power transmission vary depending on the distance between a power transmission resonance coil in a power-transmitting device and a power reception resonance coil in a power-receiving device (hereinafter also called coil-to-coil distance), making it difficult to stably transmit power with high efficiency.

FIGS. 8A1 to 8C2 illustrate the relation between the coil-to-coil distance and power transmission efficiency. FIG. 8A1 illustrates the case where the coil-to-coil distance is too short. FIG. 8B1 illustrates the case where the coil-to-coil distance is appropriate. FIG. 8C1 illustrates the case where the coil-to-coil distance is too long. FIGS. 8A2, 8B2, and 8C2 each illustrate the relation between transmission efficiency and frequency.

In the case where the coil-to-coil distance is appropriate as shown in FIG. 8B1, the maximum power transmission efficiency is obtained when the frequency is a resonance frequency $f_0$ as shown in FIG. 8B2. However, in the case where the coil-to-coil distance is too short as shown in FIG. 8A1, peak splitting in the power transmission efficiency occurs such that a peak appears with a frequency $f_0'$ and the lowest point between peaks appears with the resonance frequency $f_0$, which decreases the power transmission efficiency. In the case where the coil-to-coil distance is long as shown in FIG. 8C1, peak splitting does not occur as shown in FIG. 8C2 but magnetic coupling between the resonance coils is lower and power transmission efficiency with the resonant frequency $f_0$ is therefore lower than that in FIG. 8B2. Note that FIGS. 8A1 to 8C2 only illustrate, for easy understanding, a high-frequency power supply 111, a power transmission resonance coil 112, a power transmission coil 117, a load 121, a power reception resonance coil 122, and a load coil 129.

FIGS. 8A1 to 8C2 show that the maximum efficiency cannot be obtained with the resonance frequency $f_0$ if the coil-to-coil distance is not appropriate. Therefore, magnetic resonance wireless power feeding, which is seemingly less spatially limited as long as the coil-to-coil distance is short, is, in reality, problematic in that the power transmission efficiency dramatically decreases when strong magnetic coupling between the coils occurs.

When the load is a secondary battery, the secondary battery (e.g., lithium-ion battery) is generally charged during a constant-current charging period and a constant-voltage charging period. In the constant-current charging period, which comes immediately after charging is started, applied voltage is gradually increased, so that impedance gradually increases as the charging proceeds. During the subsequent constant-voltage charging period, the amount of charging current rapidly decreases, which rapidly increases impedance. A fluctuation in the impedance of the load further makes it difficult to feed power by magnetic resonance.

In view of the foregoing, an object of one embodiment of the present invention is to provide a wireless power feeding system using the resonance method, which can increase power transmission efficiency.

One embodiment of the present invention is a wireless power feeding system including a power transmission coil, a power transmission resonance coil for transmitting power by electromagnetic induction with the power transmission coil, a power reception resonance coil for exciting high-frequency power by magnetic resonance, a load coil for exciting high-frequency power by electromagnetic induction with the power reception resonance coil, a load electrically connected to the load coil, a variable element for controlling the amount of charging current supplied to the load, and a microprocessor for controlling the variable element. The load includes a battery charger and a battery. The battery charger is configured to charge the battery with the high-frequency power excited by the load coil.

One embodiment of the present invention is a wireless power feeding system including: a high-frequency power supply, a power transmission coil, a power transmission resonance coil for transmitting power by electromagnetic induction with the power transmission coil, a first microprocessor for controlling output of the high-frequency power supply, a power reception resonance coil for exciting high-frequency power by magnetic resonance, a load coil for exciting high-frequency power by electromagnetic induction with the power reception resonance coil, a load electrically connected to the load coil, a variable element for controlling the amount of charging current supplied to the load, and a second microprocessor. The load includes a battery charger and a battery. The battery charger is configured to charge the battery with the high-frequency power excited by the load coil. The second microprocessor is configured to control the variable element and transmit a signal to the first microprocessor. The signal is used for controlling supply current from the high-frequency power supply.

In the above wireless power feeding system, the variable element is preferably a switch provided in the battery charger.

In the above wireless power feeding system, the load preferably includes a rectifier circuit electrically connected to the load coil.

One embodiment of the present invention can provide a wireless power feeding system in which the impedance of a load is adjusted by external control, so that power feeding appropriate to the situation is achieved under conditions for the maximum power transmission efficiency regardless of positional relationship between a power transmission resonance coil in a power-transmitting device and a power reception resonance coil in a power-receiving device.

BRIEF DESCRIPTION OF THE DRAWINGS

FIGS. 8A1 to 8C2 illustrate relation between coil-to-coil distance and power transmission efficiency.

DETAILED DESCRIPTION OF THE INVENTION

Figure 1:
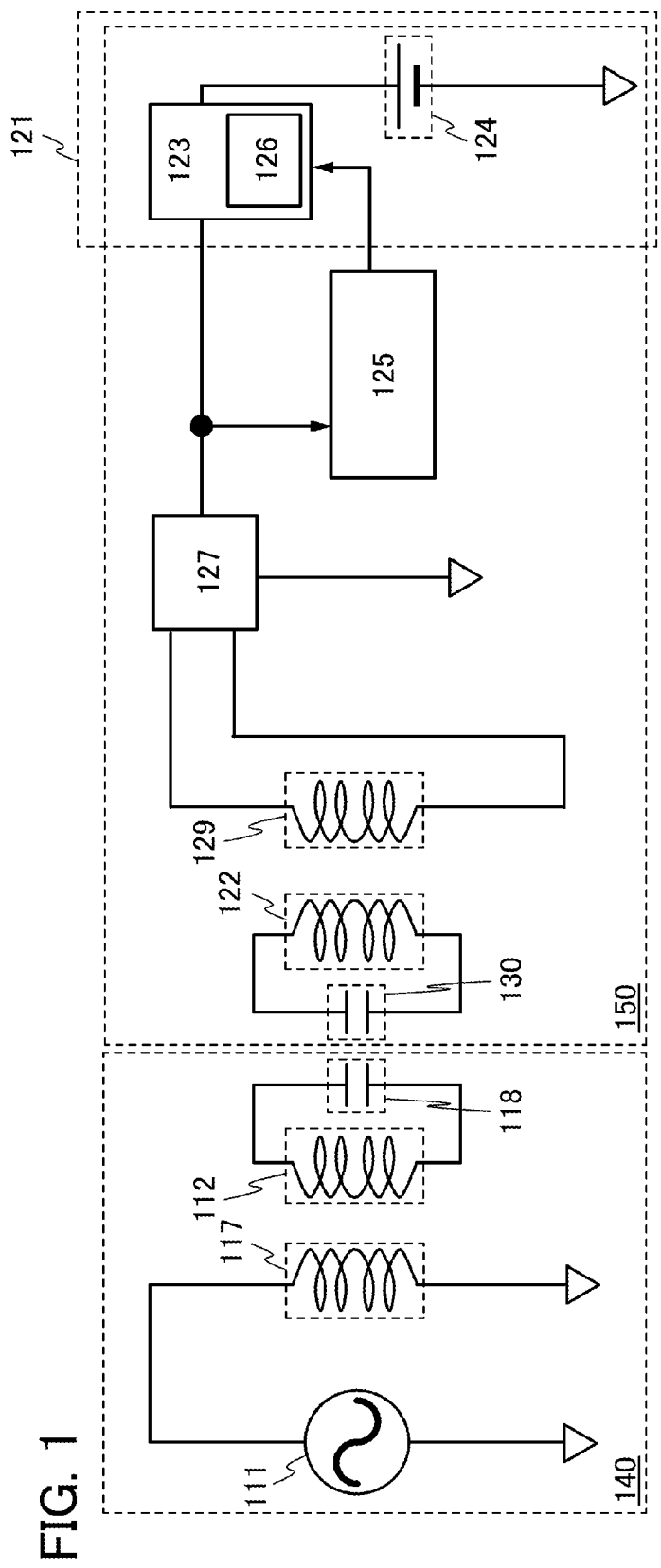
FIG. 1 is a diagram illustrating an example of a configuration of a power feeding system.

Embodiments of the present invention will be described below with reference to the drawings. Note that the embodiments can be implemented in various different ways. It will be readily appreciated by those skilled in the art that modes and details of the embodiments can be modified in various ways without departing from the spirit and scope of the present invention. The present invention therefore should not be construed as being limited to the description of the embodiments. Note that in structures of the present invention described below, reference numerals denoting the same portions are used in common in different drawings.

Note that, the size, layer thickness, and signal waveform of each object shown in the drawings and the like in the embodiments are exaggerated for simplicity in some cases. Each object therefore is not necessarily in such scales.

In this specification and the like, ordinal numbers such as "first", "second", and "third" are used in order to avoid confusion among components, and the terms do not limit the components numerically.

Embodiment 1

This embodiment describes a wireless power feeding system according to one embodiment of the present invention, which achieves wireless power feeding by the resonance method.

<Example of Configuration of Wireless Power Feeding System>

FIG. 1 illustrates a configuration of a wireless power feeding system according to one embodiment of the present invention. The wireless power feeding system in FIG. 1 uses the magnetic resonance type power transmission method. The wireless power feeding system in FIG. 1 includes a power-transmitting device 140 and a power-receiving device 150. In FIG. 1, power feeding can be achieved by electromagnetic waves when a power transmission resonance coil 112 in the power-transmitting device 140 and a power reception resonance coil 122 in the power-receiving device 150 are in resonance with each other.

The power-transmitting device 140 includes a high-frequency power supply 111, a power transmission resonance coil 112, a power transmission coil 117, and a capacitor 118. In the power-transmitting device 140, the high-frequency power supply 111 is connected to the power transmission coil 117. Electromagnetic induction occurs between the power transmission resonance coil 112 and the power transmission coil 117. One terminal of the power transmission resonance coil 112 is connected to one terminal of the capacitor 118. The other terminal of the power transmission resonance coil 112 is connected to the other terminal of the capacitor 118.

Note that the high-frequency power supply 111 may have any structure which enables generation of high-frequency power having a frequency equal to the self-resonant frequency of the power transmission resonance coil 112.

The power-receiving device 150 in FIG. 1 includes a load 121, the power reception resonance coil 122, a microprocessor 125, a rectifier circuit 127, a load coil 129, and a capacitor 130. The load 121 includes a battery charger 123, a battery 124, and a variable element 126. In the power-receiving device 150, electromagnetic induction between the power reception resonance coil 122 and the load coil 129 occurs, and the load coil 129 is connected to the load 121 via the rectifier circuit 127. The variable element 126 in the load 121 is included in the battery charger 123. One terminal of the battery 124 is connected to the battery charger 123, and the other terminal of the battery 124 is grounded.

Note that the capacitor 118 and the capacitor 130 may be the stray capacitances of the power transmission resonance coil 112 and the power reception resonance coil 122, respectively. Alternatively, the capacitor 118 and the capacitor 130 may be provided independently of these coils. The variable element 126 may instead be outside of the battery charger 123 and connected to the battery charger 123.

High-frequency power, which is AC power from the high-frequency power supply 111, is applied to, and then rectified in the rectifier circuit 127. DC voltage and direct current produced by rectification are applied to the load 121.

Although not illustrated, in the power-receiving device 150, an A/D converter may be provided between the rectifier circuit 127 and the microprocessor 125 or included in the microprocessor 125.

A DCDC converter may be provided between the rectifier circuit 127 and the load 121, DC voltage produced by rectification in the rectifier circuit is supplied to the DCDC converter where the magnitude of the DC voltage is adjusted, and then appears at the output of the DCDC converter.

The variable element 126 is capable of controlling the impedances of the battery charger 123 and the battery 124 by controlling the amount of charging current supplied to the battery 124 in the power-receiving device 150. The variable element 126 may be, for example, a switch which is included in the battery charger 123 and the switching of which is controlled by the microprocessor 125. When the variable element 126 is a switch, high-frequency power may be applied thereto; therefore, the variable element 126 is preferably a mechanical switch (e.g., a mechanical relay or a MEMS switch) which controls presence or absence of a connecting point.

In a power transfer technique using coils, there is a parameter k×Q (k is a coupling coefficient and Q is a Q value of a resonance coil) as a parameter that represents an index of high transmission efficiency. The coupling coefficient k is a coupling coefficient that represents the degree of magnetic coupling between the resonance coil on the power-transmitting side and the resonance coil on the power-receiving side. Further, the Q value is a value showing sharpness in a resonance peak of a resonance circuit. In resonance type wireless power feeding technology, the power transmission resonance coil 112 and the power reception resonance coil 122 are preferably resonance coils having extremely high Q values (for example, the Q is larger than 100, or k×Q is larger than 1) in order to achieve high transmission efficiency.

<Power Feeding Method for Wireless Power Feeding System>

Figure 2:
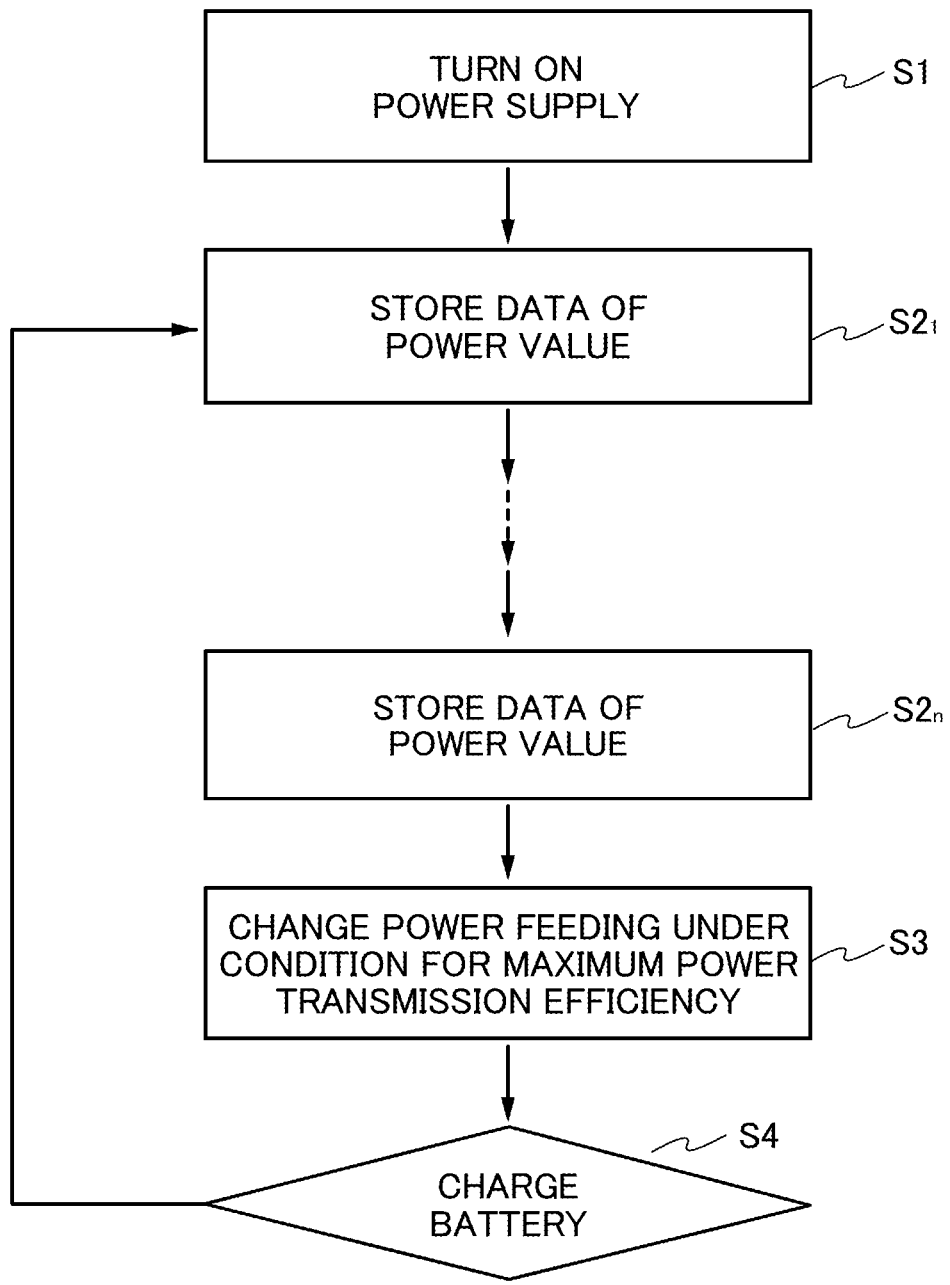
FIG. 2 is a flow chart of an example of an operation of the power feeding system.

Next, a power feeding method for a wireless power feeding system according to one embodiment of the present invention will be described with reference to FIG. 2. FIG. 2 is a flow chart illustrating an example of a power feeding method for the wireless power feeding system.

First, when the power-receiving device 150 is placed at an appropriate position with respect to the power-transmitting device 140, power feeding is started by turning on the high-frequency power supply 111 in the power-transmitting device 140 (see the step S1 in FIG. 2). At this time, efficient power transmission is not necessarily achieved. In other words, the maximum transmission efficiency is not necessarily achieved. Note that this embodiment describes the case where impedance is adjusted by controlling the amount of charging current supplied to the battery 124 in the power-receiving device 150.

When the power-transmitting device 140 starts to transmit power to the power-receiving device 150, the power is transmitted from the power transmission resonance coil 112 in the power-transmitting device 140 to the power reception resonance coil 122 in the power-receiving device 150 through magnetic coupling, then converted into DC voltage and direct current with the rectifier circuit 127, and then applied to the load 121 (including at least a secondary battery, an LED, or an IC chip, for example). At this time, the values of DC voltage and direct current applied to the load 121 in the power-receiving device 150 are obtained. The product of the DC voltage value and the direct current value at this time is a power value P1. Data D1 which is data of the obtained product of the DC voltage value and the direct current value (power value P1) is stored in the microprocessor 125 (see the step $S2_1$ in FIG. 2).

Next, the microprocessor 125 controls the variable element 126 to change the amount of charging current supplied to the battery 124. This changes the impedances of the battery charger 123 and the battery 124, so that the impedance of the entire load 121 is changed. At the same time, the microprocessor 125 obtains the values of DC voltage and direct current applied to the load 121 and calculates a power value P2, the product of the DC voltage value and the direct current value. Data D2 which is data of the power value P2 is stored in the microprocessor 125.

After n types of impedance changes, data of power values obtained every change (D1, D2 . . . , Dn) are stored in the microprocessor 125 (see the step $S2_n$ in FIG. 2).

The microprocessor 125 changes the amount of charging current supplied to the battery 124 such that power feeding is performed with any one of stored power values (D1, D2, . . . , Dn) which enables the maximum power transmission efficiency, and the battery 124 is charged (see the steps S3 and S4 in FIG. 2).

After a certain period (e.g., 10 sec) of charging, whether the impedance at the instant enables the charging to be performed under the conditions for the maximum power transmission efficiency is confirmed.

The steps $S2_1$ to $S2_n$ and the step S3 in FIG. 2 are taken again to change the amount of charging current supplied to the battery 124. Then, settings are made to optimize the impedance of the entire load 121; thus, the battery 124 is charged.

Subsequently, a loop consisting of the steps $S2_1$ to $S2_n$, the step S3, and the step S4 is repeated. When the charging is completed, the high-frequency power supply 111 is turned off.

By repeating the loop in this manner, the battery 124 can be charged efficiently even when the distance between the power-transmitting device 140 and the power-receiving device 150 changes during the charging.

The use of the power feeding method in FIG. 2 for the wireless power feeding system in FIG. 1 increases power transmission efficiency in accordance with the positional relationship between the power-transmitting device 140 and the power-receiving device 150, resulting in efficient power feeding. Therefore, the power feeding system can be more convenient for users.

Embodiment 2

This embodiment describes a configuration of a wireless power feeding system that is partly different from that in FIG. 1.

<Example of Configuration of Wireless Power Feeding System>

Figure 3:
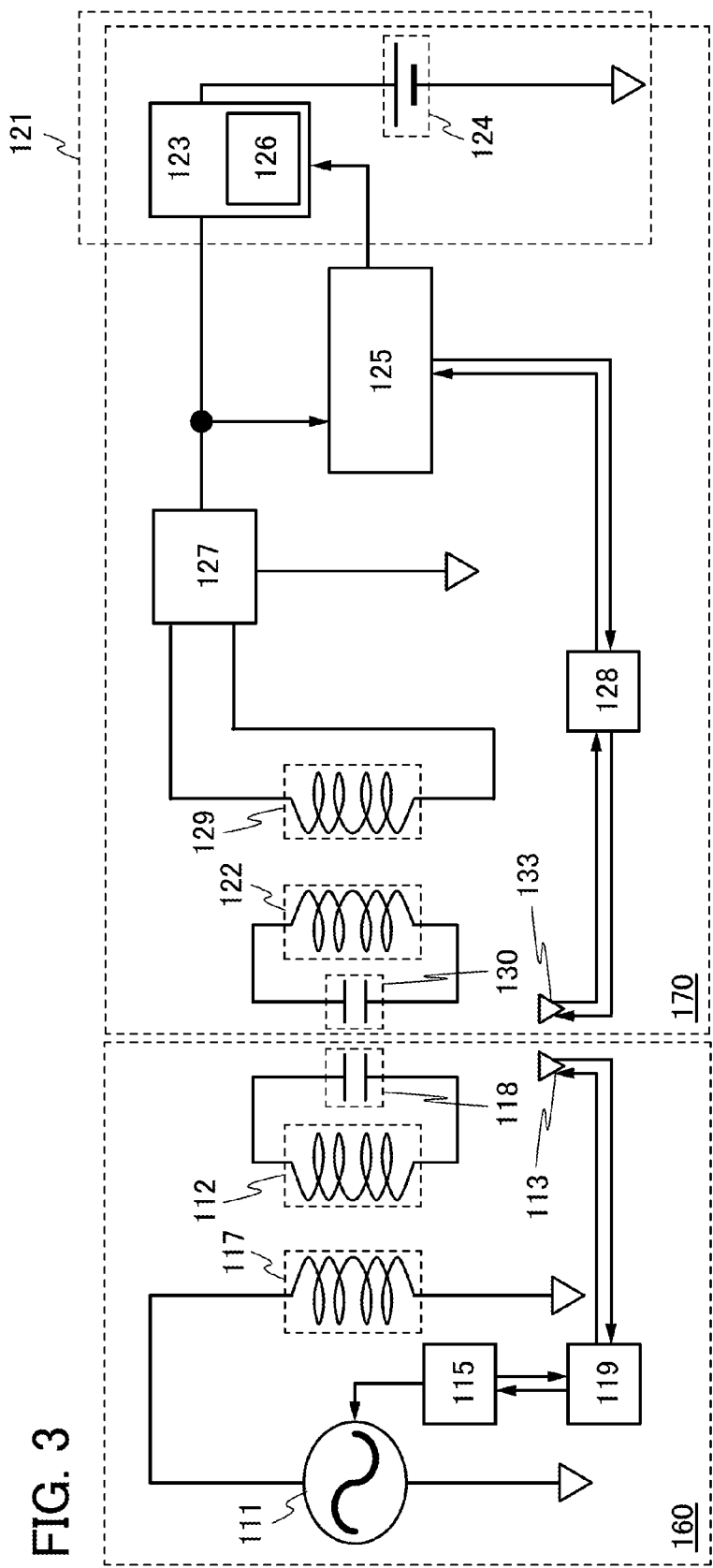
FIG. 3 is a diagram illustrating an example of a configuration of a power feeding system.

FIG. 3 illustrates a configuration of a wireless power feeding system according to one embodiment of the present invention. A power-transmitting device 160 is the same as the power-transmitting device in FIG. 1 in that it includes a high-frequency power supply 111, a power transmission resonance coil 112, a power transmission coil 117 and a capacitor 118. The power-transmitting device 160 is different from the power-transmitting device in FIG. 1 in that it includes an antenna 113, a microprocessor 115 connected to the high-frequency power supply 111, and a first transmission/reception circuit 119 connected to the microprocessor 115 and the antenna 113.

A power-receiving device 170 is the same as the power-receiving device in FIG. 1 in that it includes a load 121, a power reception resonance coil 122, a microprocessor 125, a rectifier circuit 127, a load coil 129, and a capacitor 130 and in that the load 121 includes a battery charger 123, a battery 124, and a variable element 126. The power-receiving device 170 is different from the power-receiving device in FIG. 1 in that it includes an antenna 133 and a second transmission/reception circuit 128 connected to the microprocessor 125 and the antenna 133.

In the configuration of the wireless power feeding system in FIG. 3, data of the values of DC voltage and direct current generated in the power-receiving device 170 are sent back to the power-transmitting device 160 by using the antenna 133. The power-transmitting device 160 receiving data of the DC voltage value and the direct current value obtained in the power-receiving device 170 can adjust the output of the high-frequency power supply 111 as needed.

When the battery 124 is a lithium-ion secondary battery, for example, the system is designed to prevent voltage exceeding a certain level from being applied to the battery 124 in order to inhibit application of excess voltage. Therefore, when voltage applied to the battery 124 increases to a higher level than required, a charging control circuit included in the battery charger 123 eventually reduces the voltage and power corresponding to the reduced voltage is consumed in vain. For this reason, it is preferable to reduce the output power of the high-frequency power supply 111 in the power-transmitting device 160 and supply the minimum power for maintaining the charging state.

<Power Feeding Method for Wireless Power Feeding System>

Figure 4:
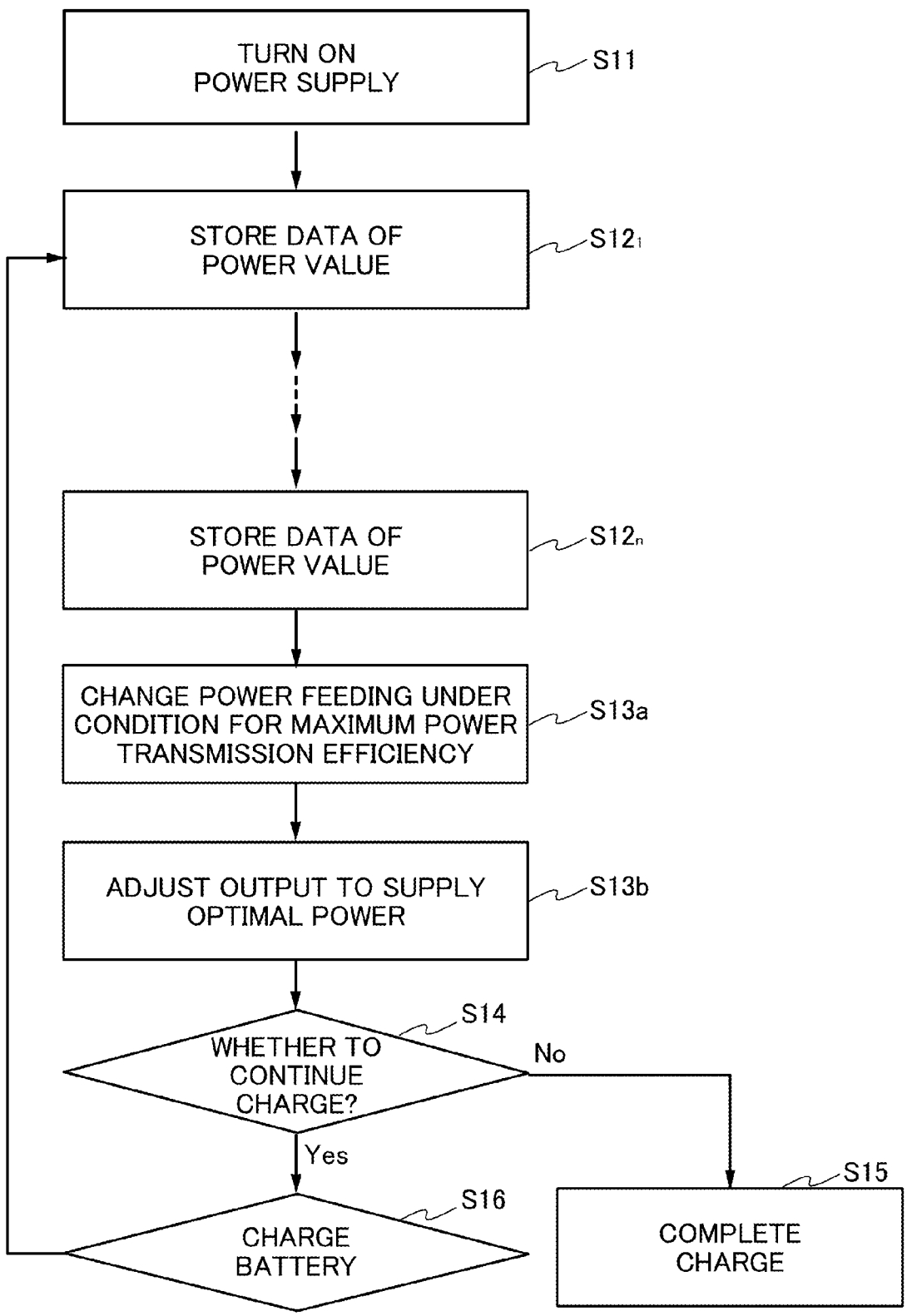
FIG. 4 is a flow chart of an example of an operation of the power feeding system.

Next, a power feeding method for a wireless power feeding system according to one embodiment of the present invention will be described with reference to FIG. 4. FIG. 4 is a flow chart illustrating an example of a power feeding method for the wireless power feeding system.

First, when the power-receiving device 170 is placed at an appropriate position with respect to the power-transmitting device 160, the power-transmitting device 160 starts to feed power to the power-receiving device 170. Power feeding is started by turning on the high-frequency power supply 111 in the power-transmitting device 160 (see the step S11 in FIG. 4). At this time, efficient power feeding is not necessarily achieved. In other words, the maximum transmission efficiency is not necessarily achieved. Note that this embodiment describes the case where impedance is adjusted by controlling the amount of charging current supplied to the battery 124 in the power-receiving device 170.

When the power-transmitting device 160 starts to transmit power to the power-receiving device 170, the power is transmitted from the power transmission resonance coil 112 in the power-transmitting device 160 to the power reception resonance coil 122 in the power-receiving device 170 through magnetic coupling, then converted into DC voltage and direct current with the rectifier circuit 127, and then applied to the load 121 (including at least either a secondary battery, an LED, or an IC chip, for example). At this time, the values of DC voltage and direct current applied to the load 121 in the power-receiving device 170 are obtained. The product of the DC voltage value and the direct current value at this time is a power value P1. Data D1 which is data of the obtained product of the DC voltage value and the direct current value (power value P1) is stored in the microprocessor 125 (see the step $S12_1$ in FIG. 4).

Next, the microprocessor 125 controls the variable element 126 to change the amount of charging current supplied to the battery 124. This changes the impedances of the battery charger 123 and the battery 124, so that the impedance of the entire load 121 is changed. At the same time, the microprocessor 125 obtains the values of DC voltage and direct current applied to the load 121 and calculates a power value P2, the product of the DC voltage value and the direct current value. Data D2 which is data of the power value P2 is stored in the microprocessor 125.

After n types of impedance changes, data of power values obtained every change (D1, D2, . . . , Dn) are stored in the microprocessor 125 (see the step $S12_n$ in FIG. 4).

The microprocessor 125 changes the amount of charging current supplied to the battery 124 such that power feeding is performed with any one of stored power values (D1, D2, . . . , Dn) which enables the maximum power transmission efficiency (see the step S13a in FIG. 4).

Next, in order that optimal power can be supplied from the high-frequency power supply 111, a signal for adjusting power is supplied from the microprocessor 125 to the second transmission/reception circuit 128, sent from the second transmission/reception circuit 128 to the first transmission/reception circuit 119 via the antenna 133 and the antenna 113, and then supplied from the first transmission/reception circuit 119 to the microprocessor 115.

The microprocessor 115 commands the high-frequency power supply 111 to adjust the output. The high-frequency power supply 111 adjusts the output to supply optimal power. In order to determine if the output of the high-frequency power supply 111 is appropriate, the microprocessor 115 commands the microprocessor 125 via the first transmission/reception circuit 119, the antenna 113, the antenna 133, and the second transmission/reception circuit 128 to monitor the DC voltage value. Monitoring of the DC voltage value is repeated; thus, optimal power is supplied (see the step S13b in FIG. 4). In an instant before completion of the charging, for example, the high-frequency power supply 111 supplies less power than the instant, and then the supplied power is gradually reduced during repetition of processes for monitoring the DC voltage value, resulting in optimal power.

Then, the microprocessor 115 determines whether the charging is to be continued, based on the output of the high-frequency power supply 111 (see the step S 14 in FIG. 4). When the output of the high-frequency power supply 111 becomes 0 and it is determined that the charging is not to be continued, the charging is completed by turning off the high-frequency power supply 111 (see the step S15 in FIG. 4). When it is determined that the charging is to be continued, the next step is taken.

After a certain period (e.g., 10 sec) of charging (see the step S16 in FIG. 4), whether the impedance at the instant enables the charging to be performed under the conditions for the maximum power transmission efficiency is confirmed.

The steps $S12_1$ to $S12_n$, the step S13a, the step S13b, the step S14 illustrated in FIG. 4 are taken again to change the amount of charging current supplied to the battery 124, make settings to optimize the impedance of the entire load 121, make settings to optimize the output of the high-frequency power supply 111, and then determine whether the charging is to be continued.

Subsequently, a loop consisting of the steps $S12_1$ to $S12_n$, the step S13a, the step S13b, the step S14, and the step S16 is repeated.

By repeating the loop in this manner, the battery 124 can be charged efficiently even when the distance between the power-transmitting device 160 and the power-receiving device 170 changes during the charging.

The use of the power feeding method in FIG. 4 for the wireless power feeding system in FIG. 3 increases power transmission efficiency in accordance with the positional relationship between the power-transmitting device 160 and the power-receiving device 170, resulting in efficient power feeding. Therefore, the power feeding system can be more convenient for users.

Embodiment 3

This embodiment describes a configuration of a wireless power feeding system that is partly different from those in FIG. 1 and FIG. 3.

<Example of Configuration of Wireless Power Feeding System>

Figure 5:
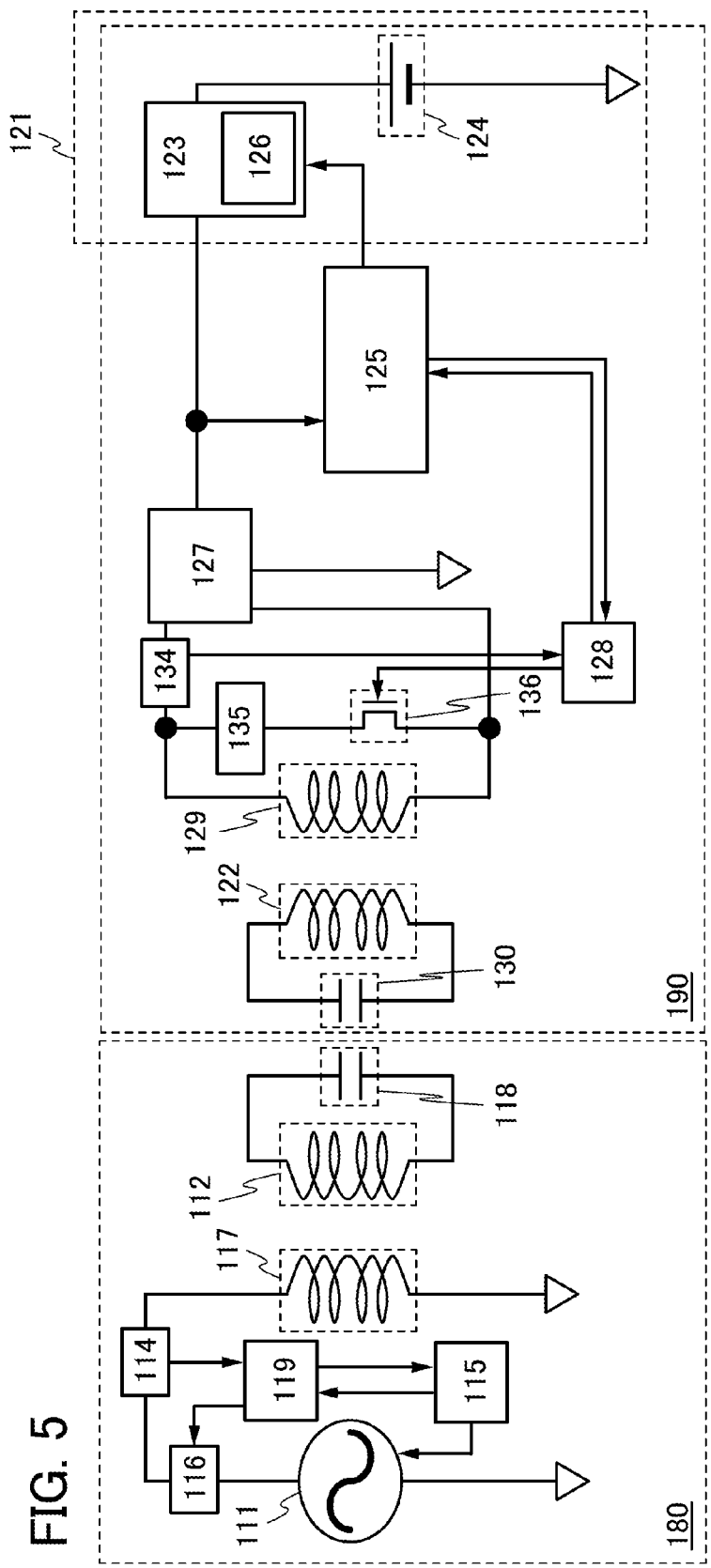
FIG. 5 is a diagram illustrating an example of a configuration of a power feeding system.

FIG. 5 illustrates a configuration of a wireless power feeding system according to one embodiment of the present invention. A power-transmitting device 180 is the same as the power-transmitting device in FIG. 3 in that it includes a high-frequency power supply 111, a power transmission resonance coil 112, a microprocessor 115, a power transmission coil 117, a capacitor 118, and a first transmission/reception circuit 119. The power-transmitting device 180 is different from the power-transmitting device in FIG. 3 in that it includes a directional coupler 114 and a mixer 116, in that the high-frequency power supply 111 is connected to the mixer 116 and the microprocessor 115, in that the first directional coupler 114 is connected to the mixer 116, the first transmission/reception circuit 119, and the power transmission coil 117, and in that the first transmission/reception circuit 119 is connected to the mixer 116 and the microprocessor 115.

A power-receiving device 190 is the same as the power-receiving device in FIG. 3 in that it includes a load 121, a power reception resonance coil 122, a microprocessor 125, a rectifier circuit 127, a second transmission/reception circuit 128, a load coil 129, and a capacitor 130. The load 121 includes a battery charger 123, a battery 124, and a variable element 126. The power-receiving device 190 is different from the power-receiving device in FIG. 3 in that it includes a second directional coupler 134 between the rectifier circuit 127 and one terminal of the load coil 129, a load 135 between one terminal of the load coil 129 and the second directional coupler 134, and a transistor 136 between the load 135 and the other terminal of the load coil 129. The second directional coupler 134 is connected to the second transmission/reception circuit 128. The second transmission/reception circuit 128 is connected to a gate of the transistor 136. One of a source and a drain of the transistor 136 is connected to the load 135. The other of the source and the drain of the transistor 136 is connected to the load coil 129.

The transistor 136 may be any type of transistor, but is preferably a transistor formed using an oxide semiconductor, in particular. A transistor formed using a highly purified oxide semiconductor has an off-state current (a current flowing into a device in the off state) of less than 10 zA/μm per micrometer of channel width, and an off-state current of as low as less than 100 zA/μm at 85° C. That is, the off-state current can be reduced to around the measurement limit or lower values. Therefore, the impedance of the power-receiving device 190 relative to the power-transmitting device 180 can be changed according to the on/off of the transistor as appropriate.

The mixer 116 is an analog multiplier. When the mixer 116 receives the output of the high-frequency power supply 111 and the output of the first transmission/reception circuit 119, two oscillatory waveforms are multiplied by each other, so that a modulated signal is superimposed on the resonance frequency.

The first directional coupler 114 and the second directional coupler 134 enables obtainment of a signal corresponding to power transmitted in the forward direction (traveling wave) and a signal corresponding to power transmitted in the reverse direction (reflected wave). In this embodiment, a signal input to the first directional coupler 114 is transmitted to the power transmission coil 117 and the first transmission/reception circuit 119, while a signal input to the second directional coupler 134 is transmitted to the rectifier circuit 127 and the second transmission/reception circuit 128.

In the configuration of the wireless power feeding system in FIG. 5, data of the values of DC voltage and direct current generated in the power-receiving device 190 are sent back to the power-transmitting device 180 according to the pattern of change in the impedance of the power-receiving device 190 relative to the power-transmitting device 180. The power-transmitting device 180 receiving data of the DC voltage value and the direct current value obtained in the power-receiving device 190 can adjust the output of the high-frequency power supply 111 as needed.

When the battery 124 is a lithium-ion secondary battery, for example, the system is designed to prevent voltage exceeding a certain level from being applied to the battery 124 in order to inhibit application of excess voltage. Therefore, when voltage applied to the battery 124 increases to a higher level than required, a charging control circuit included in the battery charger 123 eventually reduces the voltage and power corresponding to the reduced voltage is consumed in vain. For this reason, it is preferable to reduce the output power of the high-frequency power supply 111 in the power-transmitting device 180 and supply the minimum power for maintaining the charging state.

<Power Feeding Method for Wireless Power Feeding System>

Next, a power feeding method for a wireless power feeding system according to one embodiment of the present invention will be described with reference to FIG. 4 that has been used for the description of the above embodiment.

Refer to the power feeding method according to the above embodiment for the steps from initiation of power transmission to change in the impedance of the battery 124 (the steps S11 to S13a in FIG. 4).

Then, the microprocessor 125 performs processing for obtainment of received power in accordance with a demodulated signal obtained through the second directional coupler 134 and the second transmission/reception circuit 128. Subsequently, obtained received power information is output as a modulated signal via the second transmission/reception circuit 128 to change the voltage applied to the gate of the transistor 136. Thus, the impedance of the power-receiving device 190 relative to the power-transmitting device 180 is changed according to the on/off of the transistor 136.

Reverse power (power transmitted in the direction opposite to a desired direction) is amplitude-modulated through the power transmission resonance coil 112 and the power transmission coil 117 according to the pattern of change in the impedance of the power-receiving device 190 relative to the power-transmitting device 180, and then a resulting signal is input to the first directional coupler 114.

The reverse power that has been amplitude-modulated and then input to the first directional coupler 114 as described above is transmitted from the directional coupler 114 to the first transmission/reception circuit 119, demodulated in the first transmission/reception circuit 119, and then supplied to the microprocessor 115. The microprocessor 115 commands the high-frequency power supply 111 in accordance with a demodulated signal obtained with the first transmission/reception circuit 119 to adjust the output. Consequently, the high-frequency power supply 111 supplies optimal power dependent on the progress of the charging (see the step S13b in FIG. 4). At the same time, the microprocessor 115 supplies the supplied reverse power to the mixer 116 via the first transmission/reception circuit 119.

Then, the microprocessor 115 determines whether the charging is to be continued, based on the output of the high-frequency power supply 111 (see the step S14 in FIG. 4). When the output of the high-frequency power supply 111 becomes 0 and it is determined that the charging is not to be continued, the charging is completed by turning off the high-frequency power supply 111 (see the step S15 in FIG. 4). When it is determined that the charging is to be continued, the next step is taken.

After a certain period (e.g., 10 sec) of charging (see the step S16 in FIG. 4), whether the impedance at the instant enables the charging to be performed under the conditions for the maximum power transmission efficiency is confirmed.

The steps S12$_1$ to S12$_n$, the step S13a, the step S13b, the step S14 illustrated in FIG. 4 are taken again to change the amount of charging current supplied to the battery 124, make settings to optimize the impedance of the entire load 121, make settings to optimize the output of the high-frequency power supply 111, and then determine whether the charging is to be continued.

Subsequently, a loop consisting of the steps S12$_1$ to S12$_n$, the step S13a, the step S13b, the step S14, and the step S16 is repeated.

By repeating the loop in this manner, the battery 124 can be charged efficiently even when the distance between the power-transmitting device 180 and the power-receiving device 190 changes during the charging.

The use of the above-described power feeding method for the wireless power feeding system in FIG. 5 increases power transmission efficiency in accordance with the positional relationship between the power-transmitting device 180 and the power-receiving device 190, resulting in efficient power feeding. Therefore, the power feeding system can be more convenient for users. In this embodiment, communication based on wireless IC technology is achieved through an interface for resonance type power feeding. Therefore, by applying the wireless power feeding system according to this embodiment to mobile devices such as cellular phones, data transmission/reception for wireless IC fare cards or wireless applications such as electronic money can be accomplished without an additional private communication interface.

Embodiment 4

This embodiment describes applications of the wireless power feeding system described in the above embodiments. Examples of applications of the wireless power feeding system according to one embodiment of the present invention include portable electronic devices, such as digital video cameras, personal digital assistants (e.g., mobile computers, mobile phones, portable game machines, and e-book readers), image reproducing devices including a recording medium (specifically digital versatile disc (DVD) players), and electric mobile units powered by electricity, such as electric cars. Examples will be described below with reference to drawings.

Figure 6A:
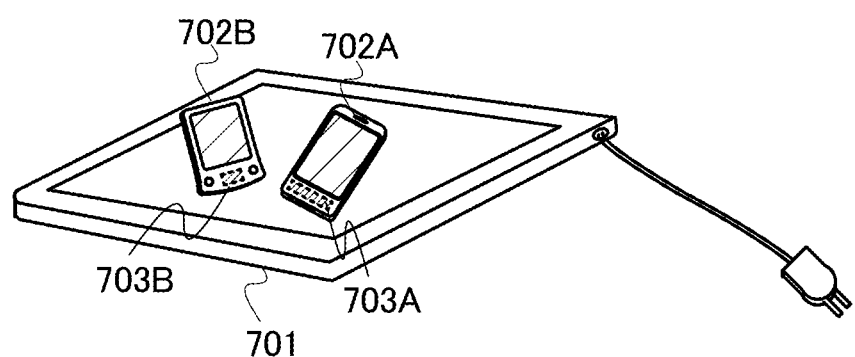
FIGS. 6A and 6B are diagrams illustrating applications of a power feeding system.

FIG. 6A illustrates the case where the wireless power feeding system is used for a mobile phone or a personal digital assistant. The wireless power feeding system includes a power-transmitting device 701, a mobile phone 702A including a power-receiving device 703A, and a mobile phone 702B including a power-receiving device 703B. The wireless power feeding system according to the above embodiments can be used between the power-transmitting device 701 and the power-receiving device 703A and between the power-transmitting device 701 and the power-receiving device 703B.

For example, the power-transmitting device 701 can have the configuration of the power-transmitting device 140, 160, or 180 according to the above embodiments, while the power-receiving device 703A and the power-receiving device 703B can have the configuration of the power-receiving device 150, 170, or 190 according to the above embodiments.

The use of the wireless power feeding system in one embodiment of the present invention can increase power transmission efficiency in accordance with the positional relationship between the power-transmitting device 701 and the power-receiving device 703A and the positional relationship between the power-transmitting device 701 and the power-receiving device 703B; thus, the power-transmitting device 701 can supply power efficiently to the power-receiving device 703A and the power-receiving device 703B.

Figure 6B:
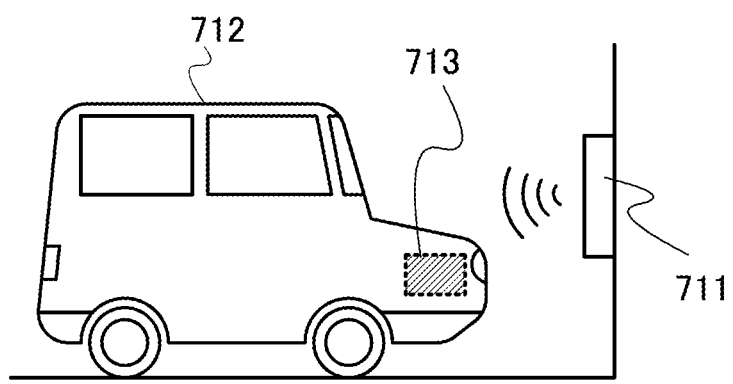

FIG. 6B illustrates the case where the wireless power feeding system is used for an electric car, a type of electric mobile unit. The wireless power feeding system includes a power-transmitting device 711 and an electric car 712 including a power-receiving device 713. The wireless power feeding system according to the above embodiments can be used between the power-transmitting device 711 and the power-receiving device 713.

For example, the power-transmitting device 711 can have the configuration of the power-transmitting device 140, 160, or 180 according to the above embodiments, while the power-receiving device 713 can have the configuration of the power-receiving device 150, 170, or 190 according to the above embodiments.

The use of the wireless power feeding system in one embodiment of the present invention can increase power transmission efficiency in accordance with the positional relationship between the power-transmitting device 711 and the power-receiving device 713; thus, the power-transmitting device 711 can supply power efficiently to the power-receiving device 713.

As described above, the wireless power feeding system according to the above embodiments can be used in any object which is electrically driven.

This embodiment can be implemented in appropriate combination with any structure described in the other embodiments.

Example 1

Figure 7A:
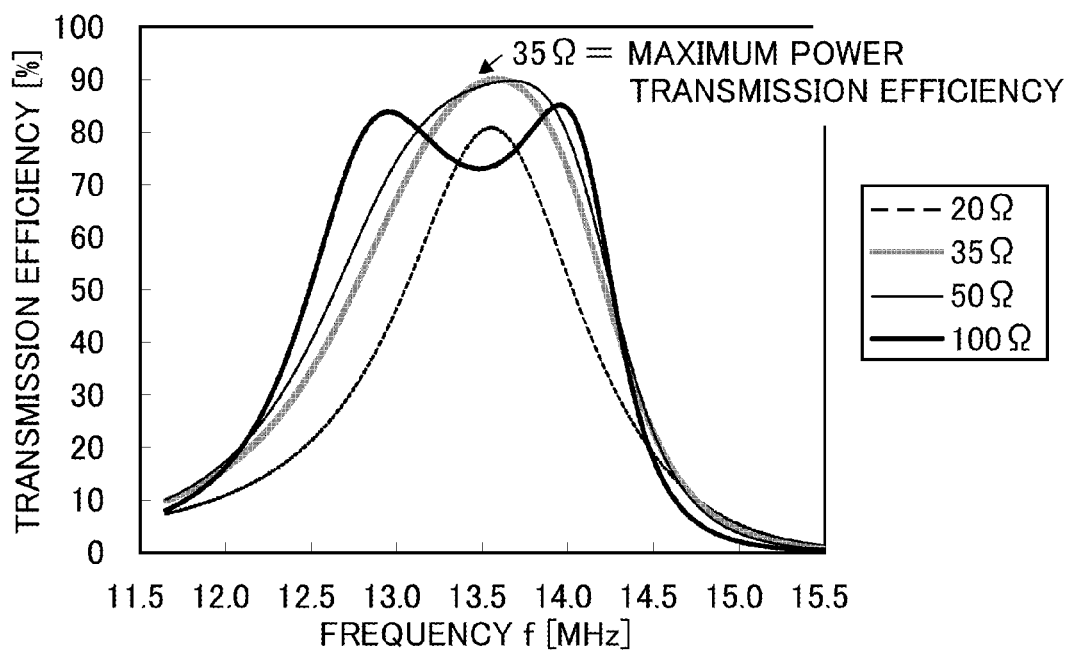
FIGS. 7A and 7B are graphs for describing Example 1.
Figure 7B:
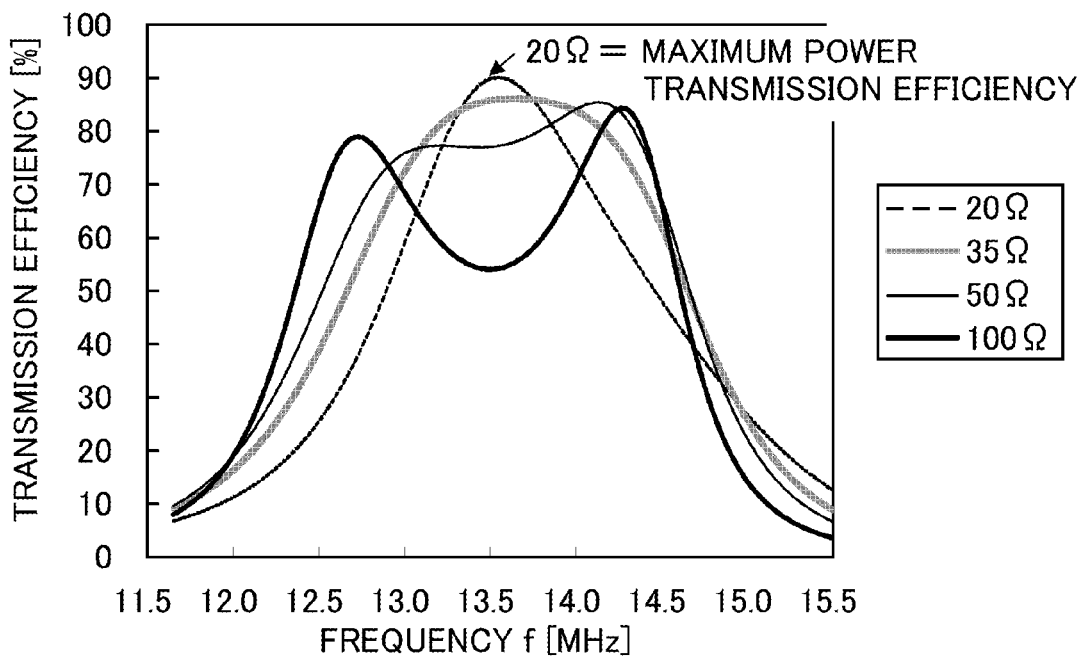

Example 1 describes how the impedance of a battery, with which the maximum power transmission efficiency between a power transmission resonance coil and a power reception resonance coil is obtained, varies depending on the distance between the power transmission resonance coil and the power reception resonance coil (also called coil-to-coil distance) with reference to FIGS. 7A and 7B. FIG. 7A shows the case where the coil-to-coil distance is longer than the distance with which the maximum transmission efficiency between the coils is obtained and magnetic coupling between the coils is weak. FIG. 7B shows the case where the coil-to-coil distance is shorter the distance with which the maximum transmission efficiency between the coils is obtained and magnetic coupling between the coils is strong. In FIGS. 7A and 7B, the horizontal axis represents frequency f [MHz], while the vertical axis represents power transmission efficiency [%]. The measurement was made with load resistors with four types of resistances: 20Ω, 35Ω, 50Ω and 100Ω which are used to change the impedance of the battery.

It was found that, as shown in FIG. 7A, the maximum transmission efficiency is obtained (f=13.56 MHz) when the impedance of the battery is about 35Ω to 50Ω in the case where the coil-to-coil distance is longer than the distance with which the maximum transmission efficiency between the coils is obtained.

It was also found that, as shown in FIG. 7B, the maximum power transmission efficiency is obtained (f=13.56 MHz) when the impedance of the battery is about 20Ω in the case where the coil-to-coil distance is shorter than the distance with which the maximum transmission efficiency between the coils is obtained.

As shown in FIGS. 7A and 7B, charging can be achieved without consuming power in vain by adjusting the impedance of the battery with the load resistors such that the maximum power transmission efficiency is always obtained in accordance with positional relationship between the coils, that is, the degree of magnetic coupling between the coils.

This application is based on Japanese Patent Application serial no. 2011-135059 filed with Japan Patent Office on Jun. 17, 2011, the entire contents of which are hereby incorporated by reference.

What is claimed is:

1. A wireless power feeding system comprising:
   a power transmission resonance coil configured to transmit power by electromagnetic induction with a power transmission coil;
   a load coil configured to excite high-frequency power by electromagnetic induction with a power reception resonance coil;
   a load electrically connected to the load coil; and
   a transistor electrically connected to the load coil,
   wherein a channel formation region of the transistor comprises an oxide semiconductor,
   wherein one of a source and a drain of the transistor is electrically connected to one terminal of the load coil, and
   wherein the other of the source and the drain of the transistor is electrically connected to the other terminal of the load coil.

2. The wireless power feeding system according to claim 1, wherein an off-state current per micrometer of a channel width of the transistor is less than 10 zA/μm.

3. The wireless power feeding system according to claim 1, wherein the power reception resonance coil is configured to excite high-frequency power by magnetic resonance.

4. The wireless power feeding system according to claim 1, further comprising a microprocessor,
   wherein the load comprises:
      a battery; and
      a battery charger comprising a variable element, the battery charger being configured to charge the battery with the high-frequency power excited by the load coil,
      wherein the variable element is configured to control an amount of charging current supplied to the load, and
      wherein the microprocessor is configured to control the variable element.

5. The wireless power feeding system according to claim 4, wherein the variable element comprises a switch.

6. The wireless power feeding system according to claim 1, further comprising a rectifier circuit electrically connected to the load coil.

7. The wireless power feeding system according to claim 1, further comprising a transmission/reception circuit,
   wherein a gate of the transistor is electrically connected to the transmission/reception circuit.

8. An electronic device comprising the wireless power feeding system according to claim 1.

9. A power-receiving device comprising:
   a load coil configured to excite high-frequency power by electromagnetic induction with a power reception resonance coil;
   a load electrically connected to the load coil; and
   a transistor electrically connected to the load coil,
   wherein a channel formation region of the transistor comprises an oxide semiconductor,
   wherein one of a source and a drain of the transistor is electrically connected to one terminal of the load coil, and
   wherein the other of the source and the drain of the transistor is electrically connected to the other terminal of the load coil.

10. The power-receiving device according to claim 9, wherein an off-state current per micrometer of a channel width of the transistor is less than 10 zA/μm.

11. The power-receiving device according to claim 9, wherein the power reception resonance coil is configured to excite high-frequency power by magnetic resonance.

12. The power-receiving device according to claim 9, further comprising a microprocessor,
   wherein the load comprises:
      a battery; and
      a battery charger comprising a variable element, the battery charger being configured to charge the battery with the high-frequency power excited by the load coil,
      wherein the variable element is configured to control an amount of charging current supplied to the load, and
      wherein the microprocessor is configured to control the variable element.

13. The power-receiving device according to claim 12, wherein the variable element comprises a switch.

14. The power-receiving device according to claim 9, further comprising a rectifier circuit electrically connected to the load coil.

15. The power-receiving device according to claim 9, further comprising a transmission/reception circuit,
   wherein a gate of the transistor is electrically connected to the transmission/reception circuit.

16. An electronic device comprising the power-receiving device according to claim 9.

17. A power-receiving device comprising:
   a load coil configured to excite high-frequency power by electromagnetic induction with a power reception resonance coil;
   a load electrically connected to the load coil; and
   a transistor electrically connected to the load coil,
   wherein one of a source and a drain of the transistor is electrically connected to one terminal of the load coil, and
   wherein the other of the source and the drain of the transistor is electrically connected to the other terminal of the load coil.

18. The power-receiving device according to claim 17, further comprising a microprocessor,
   wherein the load comprises:
      a battery; and
      a battery charger comprising a variable element, the battery charger being configured to charge the battery with the high-frequency power excited by the load coil,
      wherein the variable element is configured to control an amount of charging current supplied to the load, and
      wherein the microprocessor is configured to control the variable element.

19. The power-receiving device according to claim 17, further comprising a transmission/reception circuit,
   wherein a gate of the transistor is electrically connected to the transmission/reception circuit.

* * * * *